S. J. WENTWORTH.
CEMENT HEATING AND DISTRIBUTING APPARATUS.
APPLICATION FILED FEB. 1, 1909.
929,178. Patented July 27, 1909.
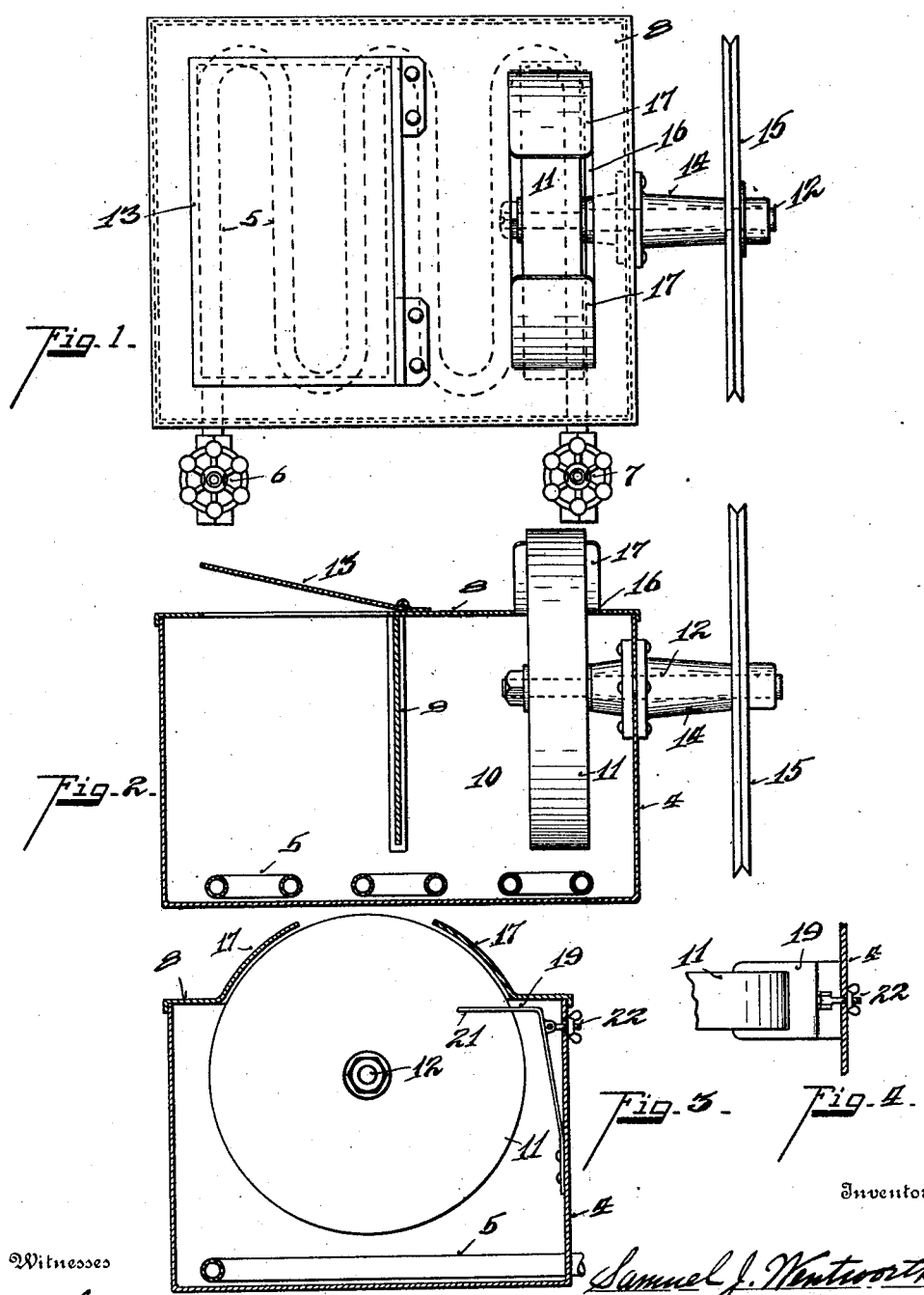

UNITED STATES PATENT OFFICE.

SAMUEL J. WENTWORTH, OF NEWPORT, KENTUCKY, ASSIGNOR TO THE WENTWORTH COMPANY, OF CINCINNATI, OHIO, A CORPORATION OF OHIO.

CEMENT HEATING AND DISTRIBUTING APPARATUS.

No. 929,178.   Specification of Letters Patent.   Patented July 27, 1909.

Application filed February 1, 1909. Serial No. 475,484.

*To all whom it may concern:*

Be it known that I, SAMUEL J. WENTWORTH, a citizen of the United States, residing at Newport, in the county of Campbell and State of Kentucky, have invented certain new and useful Improvements in Cement Heating and Distributing Apparatus, of which the following is a specification.

The primary object of my invention is to apply effective means for cementing together two or more articles such as shoe shanks made of wood, or, wood and metal bent to the appropriate shape by means of a suitable cement applied to the surface to be joined.

There are many arts which require a very strong cement which must be applied hot and which will cool quickly in order to be applied very rapidly so that the plan may be economically employed. Such uses employ a very sticky, pitchy substance tempered with petroleum or other suitable oil so as to have the requisite strength. The device herein shown and described is adapted to employ any of the well-known cements of this character, such as is used in can-labeling machines and in attaching shoe shanks to the soles.

The features of the invention are more fully set forth in the description of the accompanying drawings, forming a part of this specification, in which:—

Figure 1 is a top plan view of the cementing device. Fig. 2 is a central vertical section of Fig. 1. Fig. 3 is a section on line *x*, *x*, Fig. 1. Fig. 4 is a top plan view of the stripping mechanism.

4 represents the tank body which may be made of any suitable material.

5 represents a pipe coil as a convenient means of applying sufficient heat to melt the cement and maintain it in the proper liquid condition.

6, 7, represent cutoff valves on said pipes outside of the tank.

8 represents a cover provided with a door 13.

9 represents the partition depending downward approximately close to the pipe coil and dividing the tank into two compartments. The cement of the required constituency is strongly adhesive when cool and cools very quickly when applied and requires a considerable time to melt. The partition 9 keeps back the lumps from being carried into the pasting compartment 10, and also keeps back the cooled portion of the charge allowing only the highly heated portions of the charge to enter the pasting compartment.

11 represents a wheel journaled upon a shaft 12 which projects outside of the tank and journaled in the bearing 14.

15 represents the driving pulley.

16 represents an opening in the cover through which the periphery of the wheel projects.

17 represents guards projecting over the periphery of the wheel leaving a small space of the periphery exposed. To prevent an excess of the heated liquid cement from being carried out of the tank as the wheel is revolved, I provide an adjustable stripper 19, shown in Figs. 3 and 4.

20 represents a notch formed in the top portion thereof leaving scraper fingers 21, embracing the side peripheries of the wheel. This stripper is made adjustable to and from the periphery, so that just the desired amount of cement will be carried forward on the periphery of the wheel. In the preferred form of making this adjustment, the stripper is made of elastic material and I provide the adjusting bolt and thumb nut 22, by means of which the stripper is adjusted just close enough to the periphery of the wheel to allow only a very little of the liquid cement to be carried out of the tank, so as to prevent its being dripped in the act of pasting an article. This stripper thus serves the purpose of preventing the waste of the cement as well as serving to prevent the dripping and accumulation of the cement upon the top of the tank.

The operator takes the piece to be cemented, draws the surface of the same quickly across the periphery of the wheel between the guards and instantly applies the cement to the article to which it is to be attached.

Having described my invention, I claim:—

A device for gluing articles presented by hand comprising a horizontal inclosed tank, a vertical partition forming two chambers having a narrow gate at the bottom, a glue wheel vertically disposed in one of said chambers, a portion of the periphery of the glue-wheel being exposed to a small opening in the top of said tank, and a steam coil extending across the bottom of both chambers and underlying the glue-wheel, substantially as and for the purposes specified.

In testimony whereof, I have hereunto set my hand.

SAMUEL J. WENTWORTH.

Witnesses:
 OLIVER B. KAISER,
 ROBERT GRAF.